United States Patent [19]
Wandler et al.

[11] Patent Number: 5,991,833
[45] Date of Patent: Nov. 23, 1999

[54] COMPUTER SYSTEM WITH BRIDGE LOGIC THAT REDUCES INTERFERENCE TO CPU CYCLES DURING SECONDARY BUS TRANSACTIONS

[75] Inventors: Shaun V. Wandler, Tomball; Maria L. Melo, Houston; Todd Deschepper, Spring, all of Tex.

[73] Assignee: Compaq Computer Corporation, Houston, Tex.

[21] Appl. No.: 09/042,036

[22] Filed: Mar. 13, 1998

[51] Int. Cl.[6] ............................................. G06F 13/38
[52] U.S. Cl. ......................... 710/52; 710/112; 710/128; 710/129
[58] Field of Search .................................... 395/290, 308, 395/309, 728, 872–877; 710/52–57, 110, 112, 126, 128, 129

[56] References Cited

U.S. PATENT DOCUMENTS

| | | | |
|---|---|---|---|
| 5,396,602 | 3/1995 | Amini et al. ............................. | 395/293 |
| 5,634,073 | 5/1997 | Collins et al. .......................... | 395/825 |
| 5,649,161 | 7/1997 | Andrade et al. ........................ | 395/494 |
| 5,717,873 | 2/1998 | Rabe et al. .............................. | 395/290 |
| 5,761,452 | 6/1998 | Hooks et al. ............................ | 395/296 |
| 5,764,933 | 6/1998 | Rlichardson et al. .................. | 395/308 |
| 5,771,360 | 6/1998 | Gulick .................................... | 395/308 |
| 5,774,683 | 6/1998 | Gulick .................................... | 395/309 |
| 5,778,235 | 7/1998 | Robertson .............................. | 395/728 |
| 5,790,831 | 8/1998 | Lin et al. ................................ | 395/500 |

OTHER PUBLICATIONS

VLSI Digital Signal Processors by Vijay K. Madisetti (Georgia Institute of Technology) Chapter 3, pp. 61–63; Butterworth–Heinemann, dated 1995.

*Primary Examiner*—Xuan M. Thai
*Attorney, Agent, or Firm*—Conley, Rose & Tayon, P.C.; Michael F. Heim; Jonathan M. Harris

[57] ABSTRACT

A computer system includes a CPU and a memory device coupled through a North bridge logic device. The computer also includes a South bridge logic device coupled to the North bridge by a primary bus. The South bridge waits as long as possible before asserting a flush request (FLUSHREQ) control signal to the North bridge. The South bridge asserts the FLUSHREQ signal to the North bridge after a peripheral device coupled to the South bridge requests access to the primary bus to run a cycle. The South bridge first flushes a write queue before asserting the FLUSHREQ signal to the North bridge. In response to the FLUSHREQ control signal, the North bridge flushes one or more of its own internal write queues in preparation for the upcoming peripheral device cycle. By flushing its own internal write queue before asserting FLUSHREQ to the North bridge, the South bridge reduces the amount of time that the CPU will be prevented from accessing the primary expansion bus while the peripheral device attempts to run a cycle on the primary bus. An alternative embodiment of the invention includes a pair of South bridges, one South bridge in a laptop computer and the other South bridge in an expansion base to which the laptop computer mates.

25 Claims, 5 Drawing Sheets

COMPUTER SYSTEM WITH BRIDGE LOGIC THAT REDUCES INTERFERENCE TO CPU CYCLES DURING SECONDARY BUS TRANSACTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems. More particularly, the present invention relates to circuitry that forms a communications "bridge" between components in a personal computer system. Still more particularly, the present invention relates to a bridge logic device that includes an internal modular expansion bus for facilitating the transfer of data between an internal master device and other computer system components operating under a different protocol.

2. Background of the Invention

A personal computer system includes a number of components with specialized functions that cooperatively interact to produce the many effects available in modem computer systems. The ability of these various components to exchange data and other signals is vital to the successful operation of a computer system. Most, if not all, personal computers (PC's) include a processor (or CPU), random access memory (RAM) comprising the computer's main or system memory, and a variety of input and output devices such as a keyboard, mouse, trackball, display (or monitor) to name a few. Typically, the CPU controls most of the activities of the computer system. The CPU supervises data flow and is responsible for most of the high-level data manipulation in the computer. The CPU, therefore, is the brains of the computer system and receives signals from the peripheral devices, reads and writes data to memory, processes data, and generates signals controlling the peripheral devices.

As the processing demands of computer operators have become more sophisticated, PC's have been incorporated with additional hardware such as modems, CD ROM drives, digital video disk (DVD) drives, sound cards, video cards, and scanners. The components of the PC listed above, as well as other devices not listed, are generally interconnected by one or more "busses."

A bus is a collection of digital lines generally including address, data, and control signals. A typical bus interconnects two or more devices. The bus provides an efficient way to transfer data or commands from one device on the bus to another device also connected to the bus. To facilitate communication between bus devices, each bus device is given a unique identifier or address. Thus, one device (the "sending" device) can transfer data to another device (the "receiving" device) by placing an address unique to the receiving device on the bus along with the data to be transferred. The sending device asserts various control signals to initiate the data transfer. All of the other bus devices examine the address, but only the device to which the address corresponds will download the data from the bus.

One early bus that still is in use today is the ISA (Industry Standard Architecture) bus. The ISA bus, as the name implies, was a bus standard adopted by computer manufacturers to permit the manufacturers of peripheral devices to design devices that would be compatible with computer systems of most computer companies. The ISA bus includes 16 data lines and 24 address lines and operates at a clock speed of 8 MHz. A number of peripheral components have been developed over the years to operate with the ISA protocol.

Since the introduction of the ISA bus, computer technology has continued to evolve at a relatively rapid pace. New peripheral devices have been developed, and both processor speeds and the size of memory arrays have increased dramatically. In conjunction with these advances, designers have sought to increase the ability of the system bus to transfer more data at a faster speed. One way in which system bus has been made more effective is to permit data to be exchanged in a computer system without the assistance of the CPU. To implement this design, however, a new bus protocol had to be developed. One such bus that permits peripheral devices to run cycles independently of the CPU as a "master" device is the EISA (Extended Industrial Standard Architecture) bus. The EISA bus enables various system components residing on the EISA bus to obtain mastership of the bus and to run cycles on the bus. Another bus that has become increasingly popular is the Peripheral Component Interconnect (PCI) bus. Like the EISA bus, the PCI bus has bus master capabilities. The PCI bus also operates at a clock speed of 33 MHz or faster.

Because of the bus mastering capabilities and other advantages of the PCI (and EISA) bus, many computer manufacturers now implement one or the other of these busses as the main system bus in the computer system. Because of the proliferation of devices that had been developed for the ISA bus, the computer manufacturers also continued to provide an ISA bus as part of the computer system to permit the use of the many peripheral devices that operated under that protocol. To further provide flexibility, some computer manufacturers provide all three busses in the same computer system to permit users to connect peripheral devices of all three protocols to the computer system. To implement these various busses in the same computer system, special bridge logic circuitry has been developed to interface to the various busses.

Thus, the PC generally includes multiple busses, such as PCI bus, an ISA bus, and an EISA bus, as well as other busses such as a Pentium® bus and a small computer systems interface (SCSI) bus. Devices connected to a particular bus must comply with a particular protocol for communicating with other devices on the same bus. The protocol varies between; the bus standards. For example, the way devices communicate with each over a PCI bus generally differs from the way devices on an ISA bus communicate.

FIG. 1 shows a representative prior art computer system that includes a CPU coupled to a bridge logic device via a CPU bus. This bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). Various components that understand PCI protocol may reside on the PCI bus, such as a graphics controller.

If other expansion busses are provided in the computer system, another bridge logic device typically is used to couple the PCI bus to that expansion bus. This bridge logic is sometimes referred to as a "South bridge" reflecting its location vis-a-vis the North bridge in a typical computer system drawing. In FIG. 1, the South bridge couples the PCI bus to an ISA bus. Various ISA-compatible devices are shown coupled to the ISA bus. Exemplary bridge logic also is described in U.S. Pat. No. 5,634,073, assigned to Compaq Computer Corporation.

The application entitled "Computer System With Memory Controller and Bridge Interface Permitting Concurrent Operation," assigned to Compaq Computer Corp. describes a North bridge which includes a number of write request and read data storage queues to facilitate concurrent flow of write requests and data through the bridge. Such a bridge device permits the computer system to operate more efficiently. Cycle information flowing concurrently through the bridge between pairs of busses (for example, from the CPU bus to the memory bus) creates the potential for certain data coherency problems. These coherency problems, in part, are a result of the characteristics of one or more of the busses connected to the bridge.

By way of example, many bus protocols today implement the concept of "retry." Referring still to FIG. 1, if the graphics controller needs to read data from memory, but the memory is busy servicing an access request from the CPU, the North bridge can retry the graphics controller's read request. That is, the North bridge asserts a signal to the graphics controller directing the graphics controller to retry its read request at a later time. Retrying the cycle permits the bus to be freed for running cycles for other devices.

Other reasons exist for retrying a PCI cycle. For example, retrying a PCI read to memory may be needed to avoid a data "coherency" problem. Generally, it is important for a write cycle to run before a read cycle. To solve this problem, the PCI standard requires any pending write cycles in the North bridge to be run on the PCI bus to be executed before permitting a PCI read to run. The North bridge generally includes a CPU-to-PCI write queue in which the CPU stores write cycles to be run on the PCI bus. The North bridge is responsible for running those cycles. If a PCI read is initiated, the North bridge must first run all write cycles pending in its CPU-to-PCI queue before the PCI read can run. The process of running all pending write cycles in the queue is referred to as "flushing" the queue. The North bridge retries the PCI read cycle while it flushes its write queue.

This methodology for overcoming a possible data incoherency problem does not work in some situations. Case in point is the ISA bus. The ISA standard generally does not permit an ISA device to be retried. Accordingly, once an ISA device is granted ownership of the ISA bus to run a read cycle to memory for example, the South bridge must also obtain ownership of the PCI bus so that the cycle can go through to memory without delay. Once the South bridge obtains ownership of the PCI bus on behalf of an ISA device, the South bridge will not relinquish ownership until the ISA cycles completes and the data is read from memory. A conflict thus occurs between the PCI rule that a read cycle first requires the North bridge to flush its internal CPU-to-PCI write queue and the inability of the South bridge to relinquish control of the PCI bus to permit the North bridge to flush its queue.

To overcome this problem, the South bridge and North bridge implement a pair of control signals—flush request (FLUSHREQ) and memory acknowledge (MEMACK). Before granting an ISA device ownership of the ISA bus and obtaining ownership of the PCI bus, the South bridge first asserts FLUSHREQ to the North bridge. In response to FLUSHREQ, the North bridge flushes all CPU-to-PCI write requests pending in the CPU-to-PCI write queue. The North bridge also disallows the CPU from posting additional CPU-to-PCI write requests to the queue (referred to as a "no post" condition). After flushing the CPU-to-PCI write queue and placing the CPU into a no post condition disallowing additional write cycles to be posted to the queue, the North bridge asserts MEMACK back the South bridge. At this point the South bridge may then proceed with the ISA cycle according to standard convention.

Although this technique solves the problem noted above, the CPU effectively is not permitted continued access to the PCI bus while FLUSHREQ is asserted by the South bridge. The CPU thus cannot run PCI cycles that the CPU otherwise needs to run for its own purposes. Preventing the CPU from accessing the PCI bus may severely impair the performance of the CPU. Indeed, it would be beneficial to the performance of the CPU for FLUSHREQ to be asserted for as short a period of time as possible. This benefit is frustrated, however, if the South bridge has cycles pending in one of its own internal queues to be run on the PCI bus ahead of the ISA cycle that cause FLUSHREQ to be asserted. The South bridge typically asserts FLUSHREQ to the North bridge as soon as an ISA device indicates a need to run a memory cycle. While the other pending cycles are running, the South bridge maintains FLUSHREQ in an asserted state. The ability of the CPU to run PCI cycles thus is interfered with while these other PCI cycles are running ahead of the ISA cycle.

It thus would be desirable to minimize the period of time in which the CPU is forced to wait for an ISA-to-memory cycle to complete. A computer system that minimizes the time duration of a CPU-to-PCI no post condition would permit the CPU, and thus the overall computer system, to function more efficiently. Despite the advantages that such a system would offer, to date no such systems have been introduced.

SUMMARY OF THE INVENTION

The problems outlined above are in large part solved by a computer system that includes a South bridge logic device that waits as long as possible before asserting a flush request (FLUSHREQ) control signal to a North bridge logic. The South bridge asserts the FLUSHREQ signal to the North bridge after a peripheral device coupled to the South bridge via the ISA bus asserts a request signal indicating the need to run a cycle on a primary expansion bus coupling the South and North bridges. The South bridge flushes a write queue internal to the South bridge before asserting the FLUSHREQ signal to the North bridge. The write queue in the South bridge temporarily stores write requests from one or more peripheral devices coupled to the South bridge. Additionally, the South bridge prohibits all other peripheral devices that may want to run cycles on the primary expansion bus from storing write requests in the queue. In response to the FLUSHREQ control signal, the North bridge flushes one or more of its own internal write queues in preparation for the upcoming peripheral device cycle and prohibits a CPU from storing new cycles requests targeted for the primary expansion bus in the North bridge write queue. By flushing its own internal write queue before asserting FLUSHREQ to the North bridge, the South bridge reduces the amount of time that the CPU will be prevented from accessing the primary expansion bus while the peripheral device attempts to run a cycle on the primary bus.

According to another aspect of the invention, the computer system includes a laptop computer mated with an expansion base. Both the laptop computer and the expansion base include a South bridge device that provide logic through which devices on peripheral expansion busses can access the North bridge. In this embodiment, the North bridge preferably couples to both South bridges by way of a common primary expansion bus. Each South bridge includes a write queue for temporarily storing write cycles to be run on the primary expansion bus. Each South bridge also flushes its write queue before asserting a FLUSHREQ signal. The South bridge in the expansion base provides its FLUSHREQ signal to the South bridge in the laptop computer which then combines together, preferably through an OR gate, the expansion base FLUSHREQ signal with the FLUSHREQ signal generated by the laptop's South bridge to provide a single FLUSHREQ to the North bridge.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

The following detailed description provides in more detail the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF PREFERRED EMBODIMENTS

Figure 1:
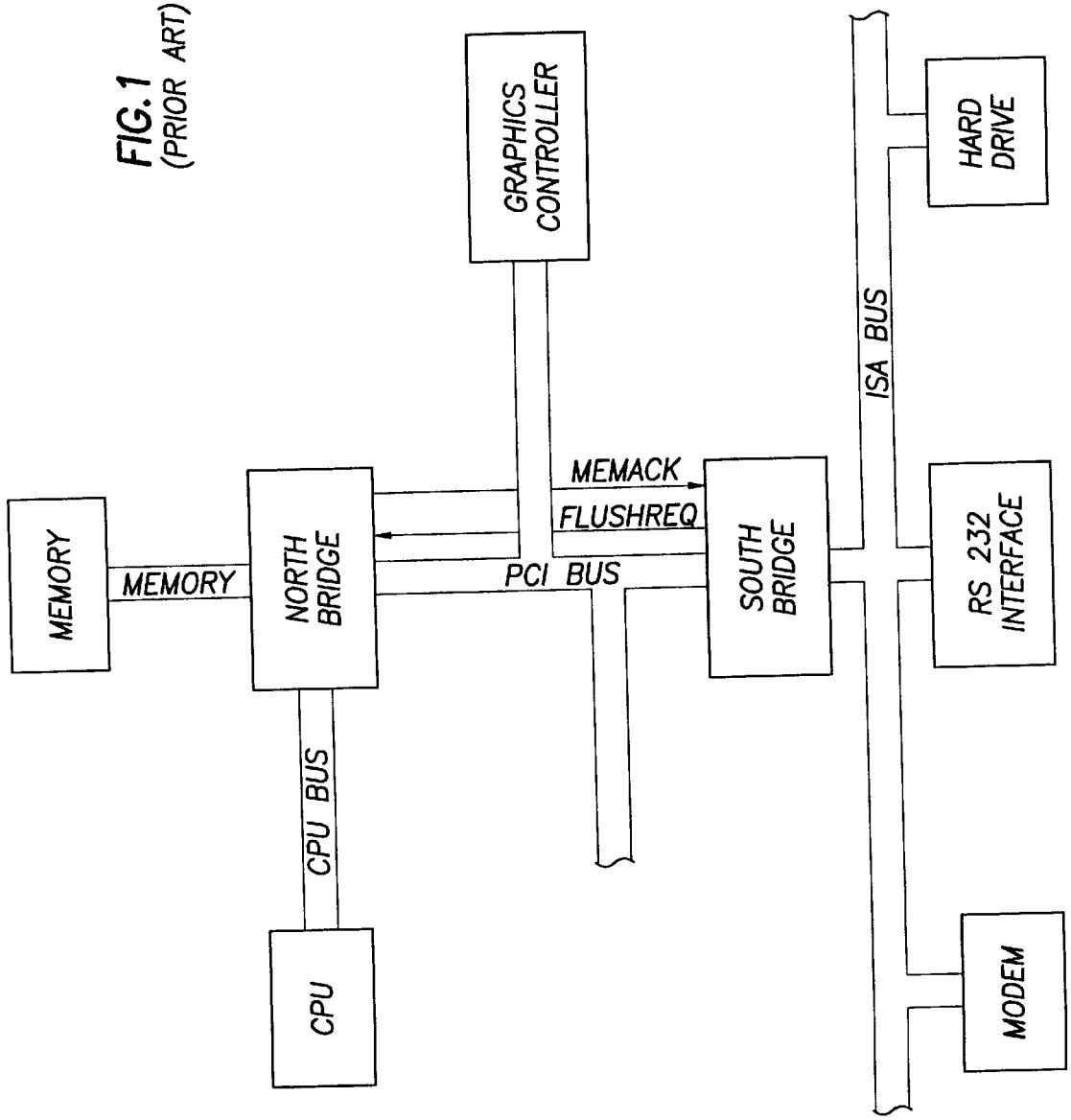
FIG. 1 is a block diagram of a prior art computer system implementing bridge logic units for coupling together dissimilar busses.
Figure 2:
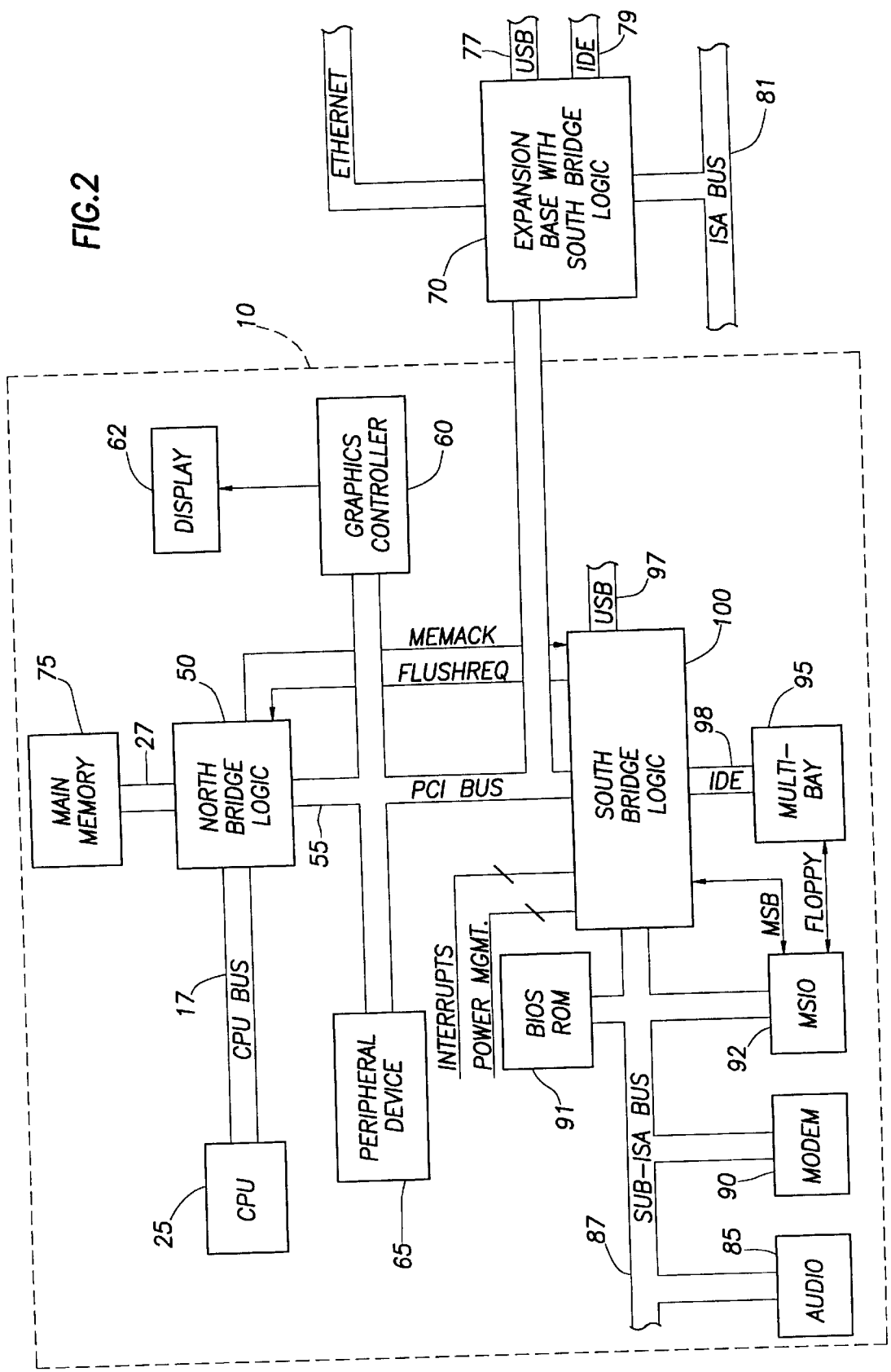
FIG. 2 is a block diagram of a portable computer system constructed in accordance with the preferred embodiment of the present invention with an improved South bridge logic unit coupled to a North bridge logic unit.

Referring now to FIG. 2, a computer system 10 constructed in accordance with the preferred embodiment generally includes a processor or CPU 25 coupled to a main memory array 75 and a variety of other peripheral computer system components through an integrated bridge logic device 50. As depicted in FIG. 2, the bridge logic 50 sometimes is referred to as a "North bridge." The CPU preferably couples to bridge logic 50 via a CPU bus 17, or the bridge logic 50 may be integrated into the CPU 25. The CPU 25 may comprise, for example, a Pentium200 microprocessor. It should be understood, however, that other alternative types of microprocessors could be employed. Further, an embodiment of computer system 10 may include multiple processors, with each processor coupled through the CPU bus 17 to the bridge logic unit 50.

The main memory array 75 preferably couples to the bridge logic unit 50 through a memory bus 27, and the bridge logic 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 that couples to the bridge logic 50 via an expansion bus 55 as shown in FIG. 2. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into and out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 75. As will be apparent to one skilled in the art, the bridge logic 50 includes a PCI interface to permit master cycles to be initiated and received by bridge logic 50. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 55 comprises a Peripheral Component Interconnect (PCI) bus. The present invention, however, is not limited to any particular type of expansion bus, and thus various busses may be used including a high speed (66 MHz or faster) PCI bus. In the preferred embodiment, a plurality of PCI peripheral devices 65 reside on the PCI bus 55. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 65 is depicted in FIG. 2, it should be recognized that computer system 10 may include any number of PCI devices as desired.

Computer system 10 preferably represents a laptop computer. If desired, as shown in FIG. 2 computer system 10 can be connected to an expansion base 70 via the PCI bus 55. This should not be construed, however, as limiting the present invention to a laptop. The present invention also may be used with a desktop system, work station, server, or handheld computer. In addition and as mentioned above, computer system 10 can be implemented with respect to the particular bus architectures shown in FIG. 2 (i.e., PCI bus), or other bus architectures, as desired. The embodiment described herein, however, assumes bus 55 represents a PCI bus, as shown in FIG. 2, and thus the following discussion will focus on configuring the present invention for that embodiment. Further, CPU 25 preferably comprises a Pentium® II processor and thus CPU bus 17 represents a Pentium II bus®. These bus protocols and the terminology used with respect to these protocols are well known to those of ordinary skill in the art. If a more thorough understanding of the PCI, or Pentium® II bus is desired, reference should be made to the *PCI Local Bus Specification*(1993), and *Intel P6 External Bus Specification*. If an AGP bus also is used in the computer system, reference may be made to the *Accelerated Graphics Port Interface Specification*(Intel, 1996).

Referring still to FIG. 2, a bus expansion device 100 also preferably connects to expansion bus 55. Bus expansion device 100 preferably comprises a bridge logic device and, as such, is referred to as a "South bridge". South bridge 100 couples or "bridges" the primary expansion bus 55 to other secondary expansion busses. These other secondary expansion busses may include an ISA (Industry Standard Architecture) bus, a sub-ISA bus, a USB (Universal Serial Bus), an IDE bus, an IEEE 1394 standard (or "fire wire") bus, or any of a variety of other busses that are available or may become available in the future. In the preferred embodiment of FIG. 2, the South bridge logic 100 couples to a sub-ISA bus 87, a USB bus 97 and an IDE bus 98. As will be apparent to one skilled in this art, various peripheral devices may be coupled to each of these busses. Thus, as shown in the preferred embodiment of FIG. 2, an MSIO (Mobile Super I/O) chip 92 connects to the sub-ISA bus, as does an audio card 85, modem 90 and BIOS ROM 91. Similarly, according to the preferred embodiment, a multi-bay configuration 95 couples to the IDE bus 98 and to the MSIO 92. The multi-bay configuration 95 preferably includes three independent bays connected in any master/slave, primary/secondary configuration supporting hot-plugging of IDE devices in the bays. As one skilled in the art will understand various IDE devices are available including CD ROM drives, floppy drives, tape drives, and the like. The USB 97 supports various peripherals, especially video peripherals such as video cameras for teleconferencing purposes. In addition to the busses discussed above, the South bridge also preferably connects to interrupt signal lines, power management signal lines, and a MSB (MSIO Serial Bus).

As noted above, the computer system 10 preferably comprises a laptop computer, and if desired, to be used in a traditional desktop environment, an expansion base preferably is available for connecting the laptop computer system to additional peripheral devices and to a computer network via an Ethernet bus. The expansion base may include any type of configuration, including a port replicator or docking station. The present invention envisions, however, that the expansion base also includes a South bridge logic (not shown specifically in FIG. 2) for coupling components on the PCI bus 55 to other components coupled to the expansion base 70. Thus, as shown in FIG. 2, a South bridge logic device within the expansion base 70 couples the PCI bus to various expansion busses including an ISA bus 81, USB 77 and IDE bus 79. The following discussion focuses on the architecture of the South bridge logic 100. This same architecture may be used (with some minor modifications), if desired, for the South bridge logic within the expansion base 70. Alternatively, the present invention also may be implemented by using a prior art South bridge device in the expansion base 70.

In accordance with the preferred embodiment of the invention, the South bridge 100 asserts a FLUSHREQ control signal (which may be active low) to the North bridge 50 when a device coupled to the sub-ISA bus 87 requests access to the PCI bus 55. In contrast to prior computer systems, however, the South bridge of the preferred embodiment flushes its own internal queue, in which write cycles to be run on the PCI bus may be posted, before asserting FLUSHREQ to the North bridge. In this manner, the South bridge waits as long as possible before asserting FLUSHREQ. The North bridge 50 responds to FLUSHREQ by flushing one or more of its internal queues (described below with reference to FIG. 4) and preventing the CPU 25 from attempting to run additional cycles on the PCI bus. Once the North bridge 50 has responded in this manner to the receipt of FLUSHIREQ, the North bridge asserts MEMACK (which also may be active low) back to the South bridge which then permits the ISA device to run its cycle on the ISA bus. This technique is described in more detail below.

Although the preferred embodiment of the invention will be described with reference to running ISA device cycles on the PCI bus, the principles of the present invention are generally applicable to any bus, now known or later developed, that does not support retry or for which data incoherency problems may occur. More broadly, the invention applies to any South bridge or other bus device which asserts a control signal to a North bridge in anticipation of a cycle to the North bridge that causes the North bridge to interfere with cycles run by another device, namely the CPU. By waiting as long as possible before asserting the control signal (FLUSHREQ) to the North bridge, the length of time during which the CPU cycles are interfered with or obstructed is reduced or minimized.

Figure 3:
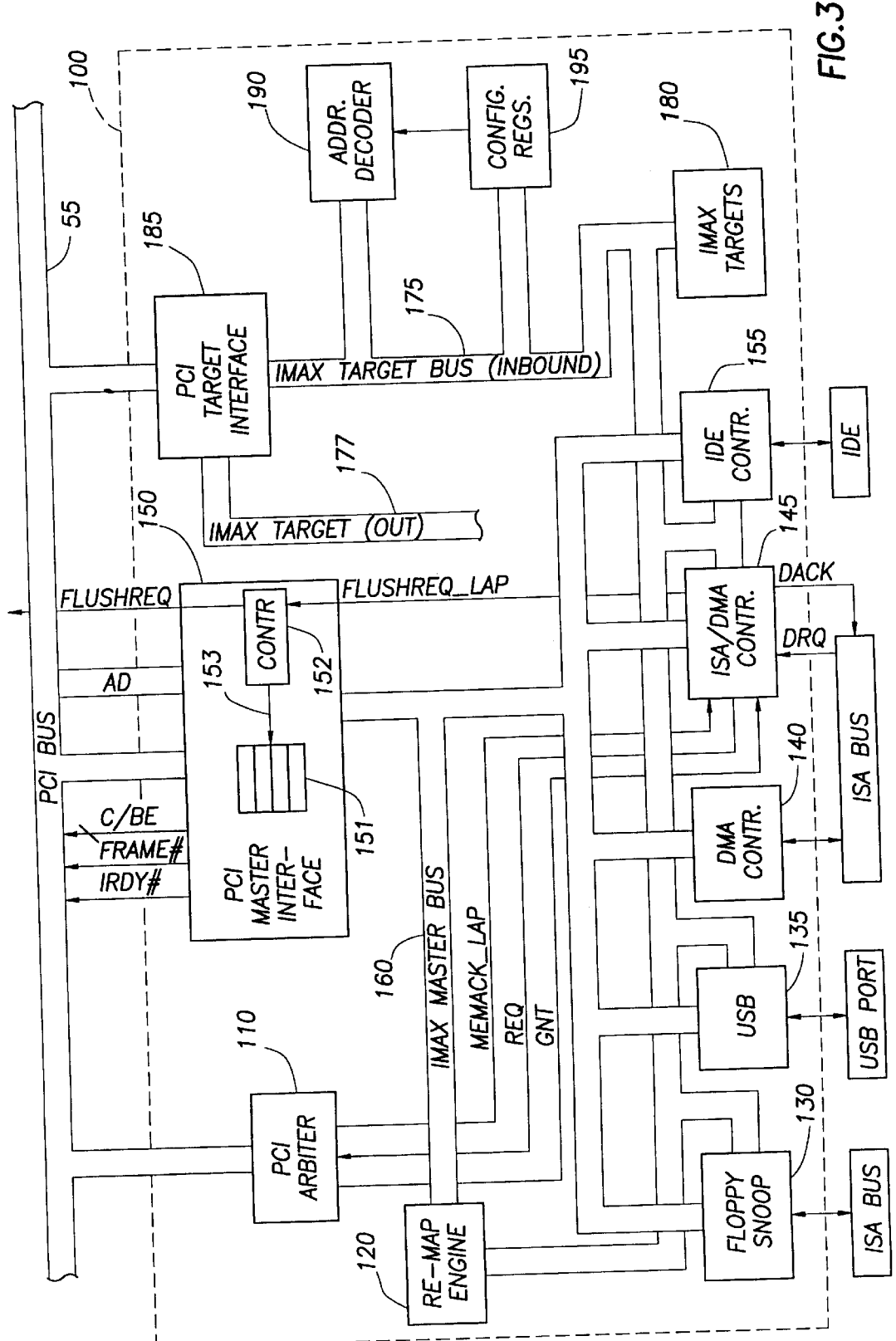
FIG. 3 is a block diagram of the South bridge of FIG. 2.

Referring now to FIG. 3, the South bridge logic 100 constructed in accordance with the preferred embodiment comprises the PCI master interface 150, a PCI target interface 185, a PCI arbiter 110, a plurality of various master devices, an IMAX (Internal Modular ASIC EXpansion) master bus 160 coupling the master devices to the PCI master device 150, and a PCI target bus coupling a PCI target interface 185 to IMAX targets. The IMAX master devices integrated into the South bridge 100 preferably include a floppy snoop logic 130, USB controller 135, ISA/DMA controller 145, IDE controller 155, and re-map engine 120. Except for the re-map engine 120, each of these masters functions as an interface to an external component or bus.

Although FIG. 3 shows the South bridge 100 connecting to a PCI bus, it should be understood that expansion bus 55 may comprise any type of system bus capable of use in a computer system. Thus, for example, expansion bus 55 may comprise an IEEE standard 1394 ("fire wire") bus, or any other suitable bus. Similarly, while bus master interface device 150 is shown as a PCI master, master interface 150 may be modified for use with other bus standards. The only requirement is that master interface must be capable of running master cycles on the expansion bus.

The internal master devices comprise control interfaces within the South bridge associated with components and/or busses external to the South bridge 100. Each of these masters are capable of obtaining mastership of the IMAX master bus 160, and with the assistance of the bus master 150, running master cycles on the PCI bus 55. The USB master 135, therefore, interfaces to the USB and initiates master cycles on the IMAX master bus 160. The IDE IMAX master 155 interfaces to the IDE bus and initiates master cycles on the IMAX master bus 160. The IMAX master bus 160 couples the various internal controllers to the PCI master interface 150. Thus, the IMAX master bus 160 preferably includes data, address and control lines for transmitting the necessary information to the PCI bus master 150 to enable that device to execute PCI master cycles.

Referring still to FIG. 3, the PCI Master interface 150 executes PCI cycles on behalf of ISA/DMA bus master 145, the DMA re-map 120, floppy snoop logic 130, USB master 135 and IDE master 155. As a PCI master, the PCI master interface 150 runs memory and I/O read and write cycles on the PCI bus. The PCI master interface 150 also preferably runs memory read line commands when filling ISA/DMA, IDE, and USB read line buffers. Thus, the PCI master interface 150 asserts standard PCI protocol signals on the PCI bus 55, including multiplexed address and data signals (AD), and FRAME#, C/BE#, IRDY#. The PCI master interface 150 translates IMAX master cycles from the IMAX masters to PCI cycles.

In the preferred embodiment, the PCI master interface 150 includes internal IMAX arbiter logic that arbitrates mastership of the IMAX bus 160. Although any arbitration scheme may be used, the preferred embodiment implements a least recently used (LRU) arbitration scheme for awarding mastership of the IMAX master bus 160. Once the internal IMAX arbiter unit arbitrates mastership of the IMAX master bus, the PCI master interface 150 issues control signals selecting a particular master. Although not shown specifically in FIG. 3, each of the IMAX masters indicate a request for mastership of the IMAX master bus 160 by asserting a imReq signal to the PCI master interface 150. The PCI master interface 150 awards mastership by returning an imGnt signal to the IMAX awarded mastership.

The PCI target interface 185 monitors PCI bus cycles and determines when to respond. In the preferred embodiment, the PCI target interface 185 couples to an internal address decoder 190 and configuration registers 195. The configuration registers are used to determine if a target is within the South bridge or whether the address is located on the IDE or USB bus. The PCI target interface 185 couples to an IMAX target bus 175 that transmits inbound address, data and control signals to IMAX targets 180. Each of the IMAX masters also preferably constitutes a target for the IMAX target interface 185. The PCI target interface 185 also couples to an IMAX outbound target bus 177 that supplies data from targets during PCI read cycles. More information regarding the IMAX master and target busses for South bridge 100 may be obtained from commonly assigned and co-pending patent applications entitled "Computer System With Bridge Logic That Includes An Internal Modular Expansion Bus And A Common Master Interface For Internal Master Devices" and "Computer System With Bridge Logic That Includes An Internal Modular Expansion Bus And A Common Target Interface For Internal Target Devices."

The address decoder 190 couples to the IMAX target bus 175 and to the configuration registers 195. The address decoder preferably conducts positive decoding of PCI cycles. In addition, in the preferred embodiment the PCI target interface 185 also operates as the subtractive decode agent for the PCI bus. Thus, the PCI target interface 185 claims a PCI cycle by asserting DEVSEL# on the PCI bus 55 when no other PCI device responds to a PCI cycle. These cycles then are passed by the target interface 185 to the ISA bus via the ISA controller 145.

The PCI arbiter 110 couples to the PCI bus 55 and receives request signals (not shown) from the various PCI masters on the PCI bus (including PCI master interface 150). The PCI arbiter selects one of the requesting masters and assigns the PCI cycle to that master according to known techniques. In the preferred embodiment, the PCI arbiter 110 selects a master from multiple requesting masters based upon a least recently used (LRU) arbitration scheme. Based on this protocol, after a master is granted mastership of the bus 55, the bus is re-arbitrated and the current master is put on the bottom of the priority stack.

The IDE controller 155 operates as both a master and as a target within the South bridge 100. Thus IDE controller 155 couples to both the IMAX master bus 160 and the IMAX target bus 175. The IDE controller 155 preferably comprises a dual mode controller that couples to IDE interface for the IDE bus. Similarly, the USB controller 135 couples to the USB port on the computer system 10. The USB controller 135 preferably operates as both a master and as a target and thus couples to both the IMAX master bus 160 and to the IMAX target bus 175.

Figure 4:
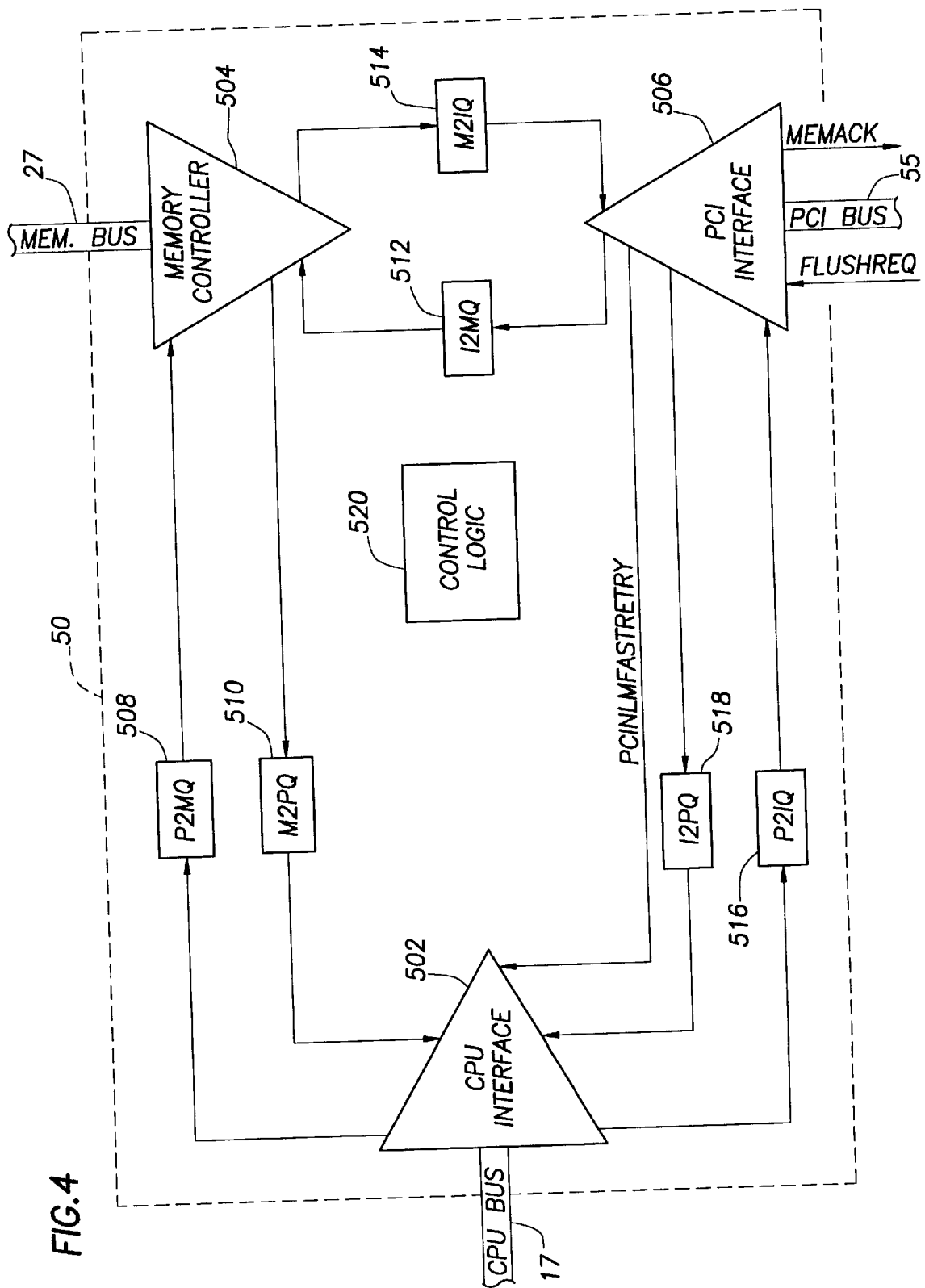
FIG. 4 is a block diagram of the North bridge of FIG. 2.

Referring now to FIGS. 2 and 4, the floppy snoop logic 130 operates as both a South bridge master and target. Thus, floppy snoop 130 couples to the IMAX master bus 160 and to the IMAX target bus 175. In addition, the floppy snoop logic 130 also couples to the floppy drive through the ISA bus as shown in FIG. 4. When a PCI write cycle is made to a floppy address that is shadowed in the expansion base 70, the snoop logic 130 will cause a retry cycle to be issued to the PCI master that initiated the cycle to start a delayed transaction. The floppy snoop then initiates the floppy write cycle on the PCI bus through the PCI master interface 150 to shadowed floppy registers in the expansion base 70. At the same time, the floppy snoop logic 130 also runs a write cycle to the MSIO 92 on the sub-ISA bus 87. When the external PCI master retries the write cycle, the snoop logic completes the delayed transaction.

Referring still to FIG. 4 the DMA controller in the ISA/DMA controller logic 145 preferably provides 24 bits of memory address and 16 bits of byte count for each of 7 DMA channels. The ISA/DMA controller 145 presents an 8-bit interface and thus only is programmed with 8-bit I/O instructions. The ISA/DMA controller 145 supports 8 or 16-bit DMA transfers to memory on the PCI (or other expansion) bus 55. The ISA/DMA controller 145 couples to the ISA (or sub-ISA) bus and when the DMA has control of the ISA bus, the ISA/DMA controller 145 translates the DMA commands into the appropriate bus cycles. As shown in FIG. 4, the ISA/DMA controller 145 operates as both a master and as a slave, and thus couples to both the IMAX master bus 160 and the IMAX target busses 175 and 225.

South bridge 100 preferably also includes an ISA bus controller 145. The ISA bus controller provides an electrical interface between the South bridge and the ISA bus. Although only a request signal (DRQ) and an acknowledge signal (ACK) are shown connecting the ISA controller 145 to the ISA bus, one of ordinary skill in the art will recognize that other well-known ISA bus signals also connect the ISA controller to the ISA bus.

In accordance with the preferred embodiment of the invention, DMA devices connected to the ISA bus assert a DRQ to the ISA controller 145 when the ISA device needs to run a cycle on the ISA bus. In response to the assertion of DRQ, the ISA controller asserts FLUSHREQ_LAP to the PCI master interface 150. The PCI master interface 150 generally includes a queue 151 and control logic 152. The queue 151 is used to temporarily store write requests from one or more of the master interfaces (such as the ISA controller 145). As shown, the queue 151 includes four rows of storage, but can be adapted to provide as much or as little storage as is needed for a given application. The control logic 152 controls or adjusts pointers 153 that determine in which row of storage a new write request is stored ("posted") in queue 151 and from which row a request is taken for placement on to the PCI bus 55.

The queue 151 in the PCI master interface 150 generally operates according to a first in-first out (FIFO) algorithm. That is, the next write request in the queue to be run on the PCI bus 55 is the request that has been waiting in the queue for the longest period of time. If an ISA write request, for example, is placed into the queue at a time when the queue already had other write requests pending, those other write requests will be run before the ISA request is allowed to run. The South bridge device of prior computer systems would have responded to a DRQ by immediately asserting a FLUSHREQ signal to the North bridge at a time while other write cycles were pending in queue 151.

In accordance with the preferred embodiment of the invention, to minimize the amount of time the CPU 25 (FIG. 2) is prevented from accessing the PCI bus 55 while an ISA cycle is pending in the South bridge and then running on the PCI bus, the ISA controller asserts a control signal labeled FLUSHREQ_LAP to the control logic 152 of the PCI master interface 150. In response to the assertion of FLUSHREQ_LAP, the PCI master interface 150 responds by flushing its queue 151 and preventing any additional write requests (other than the ISA cycle) from being stored in the queue. Once the queue 151 is flushed, the control logic 152 then asserts the FLUSHREQ control signal to the North bridge. Thus, the South bridge 100 of the present invention waits as long as possible before asserting FLUSHREQ to the North bridge. Alternatively, the PCI master interface 150 may assert a control signal to the PCI arbiter 110 after the queue 151 is flushed and the PCI arbiter may assert the FLUSHREQ to the North bridge.

The following discussion explains one way in which the North bridge 50 may respond once the South bridge 100 asserts FLUSHREQ. Referring to FIG. 4, the North bridge 50 generally includes a CPU interface 502, a memory controller 504 and a PCI interface 506 to interconnect the CPU bus 17, memory bus 27 and PCI bus 55, respectively. A read and a write queue are disposed between each of the interfaces 502, 506 and memory controller 504. Specifically, CPU interface 502 connects to the memory controller 504 via a CPU-to-memory write queue (P2MQ) 508 and a memory-to-CPU read queue (M2PQ) 510. Similarly, the PCI interface 506 connects to the memory controller 504 via a PCI-to-memory write queue (I2MQ) 512 and a memory-to-PCI read queue (M2IQ) 514. Finally, the CPU and PCI interfaces interconnect by way of a CPU-to-PCI write queue (P2IQ) 516 and a PCI-to-CPU read queue (I2PQ) 518. A write request from one bus to another bus are temporarily stored or "posted" to the respective write queue 508, 512, or 516 pending execution by the target bus. Read data returned by a target bus to the bus initiating the read cycle is temporarily stored in the respective read queues 510, 515, or 518 pending retrieval by the bus initiating the read. Control of the read and write queues is performed by the control logic 520 via control lines not shown in FIG. 4 for sake of clarity.

Referring still to FIG. 4, the FLUSHREQ signal asserted by the South bridge 122 preferably is provided to the PCI interface 506 in the North bridge. In response to the South bridge 122 asserting the FLUSHREQ signal, the PCI interface 506 executes (or "flushes") CPU write cycles posted in the P2IQ 516 and, if desired, the P2MQ 508. At approximately the same time, the PCI interface 506 also asserts a PCINLMFASTRETRY control signal to the CPU interface 502. The PCINLMFASTRETRY signal commands the CPU interface to cease posting additional CPU-to-PCI write cycles to the P2IQ 516 and, again if desired, ceases posting CPU-to-memory write cycles in the P2MQ 508. The CPU interface 502 discontinues posting additional write cycles to the write queues using any suitable technique such as retrying any attempted CPU cycles that target the PCI bus 55 or memory 75. The combination of the PCI interface 506 flushing the P2IQ 516 and the CPU interface 502 ceasing the posting of additional CPU-to-PCI write cycles to the P2IQ 156 causes all posted CPU-to-PCI write requests to be completed and the CPU from obtaining any further access to the PCI bus.

The process for running a cycle initiated by an ISA device to the North bridge 50 will now be described with reference to FIGS. 2–4. First, the ISA device asserts its DRQ line to the ISA controller 145 in South bridge 100 to indicate a need to run a cycle. In response, the ISA controller asserts the FLUSHREQ_LAP signal to the PCI master interface 150 which flushes queue 151 and prevents additional cycle requests from being posted to queue 151 (other than the ISA cycle request). Then, the PCI master interface 150 asserts FLUSHREQ to the North bridge 50 which flushes the P2IQ 516 as described above. Afterwards, the PCI interface 506 in the North bridge returns a MEMACK signal to the PCI arbiter 110 in the South bridge to indicate that P2IQ 516 has been flushed and the ISA cycle can be run.

In response to receiving MEMACK, the PCI arbiter 110 asserts a MEMACK_LAP signal to the ISA controller to indicate that the ISA controller can now request access to the PCI bus to complete its cycle. When the ISA controller 145 is ready to run its cycle, the ISA controller asserts a request (REQ) signal the PCI arbiter. The PCI arbiter 110 arbitrates for control of the PCI bus and grants control of the bus to the ISA controller 145 according to its predetermined arbitration protocol. Access to the PCI bus 55 is granted by the PCI arbiter 110 by asserting the grant (GNT) signal to the ISA controller 145. At this point, the ISA controller is free to run its cycle through the PCI master interface 150 according to any suitable protocol such as that described in copending application titled "Computer System With Bridge Logic That Includes an Internal Modular Expansion Bus and a Common Master Interface for Internal Master Devices." As one of ordinary skill in the art will recognize, the ISA controller may start the data transfer for the ISA cycle by asserting the DACK acknowledge signal to the ISA device that initiated the cycle through its DRQ signal. Then, under the control of the ISA/DMA controller, the ISA device will then proceed to place data on the ISA bus for a write cycle or start a read request.

Because the South bridge 100 waits as long as possible before asserting FLUSHREQ to the North bridge 50, the South bridge minimizes the length of time in which the CPU 25 is prevented from executing PCI bus cycles. During the time in which FLUSHREQ_LAP is asserted internally to the South bridge and the PCI master interface 150 is flushing its queue 151, the CPU 25 can continue to run cycles on the PCI bus 55. Thus, the South bridge 100 permits the CPU 25 to run as many cycles to the PCI bus as desired, in accordance with the operation of the North bridge 104, before asserting the FLUSHREQ signal and placing the CPU interface 502 into a "no post" condition. By waiting as long as possible before the South bridge 100 asserts FLUSHREQ, the performance impact on CPU-to-PCI transactions is reduced and generally minimized.

As noted above with reference to FIG. 2, computer system 10 may comprise a laptop computer and may be connected to an expansion base 70. In this configuration, both computer system 10 and expansion base 70 include a South bridge as shown. As shown, computer system 10 includes a South bridge 100 and expansion base 70 includes a South bridge 200 in addition to other known components not shown for sake of clarity. The expansion base South bridge generally is similar to the South bridge 100 described above with reference to FIG. 3.

Figure 5:
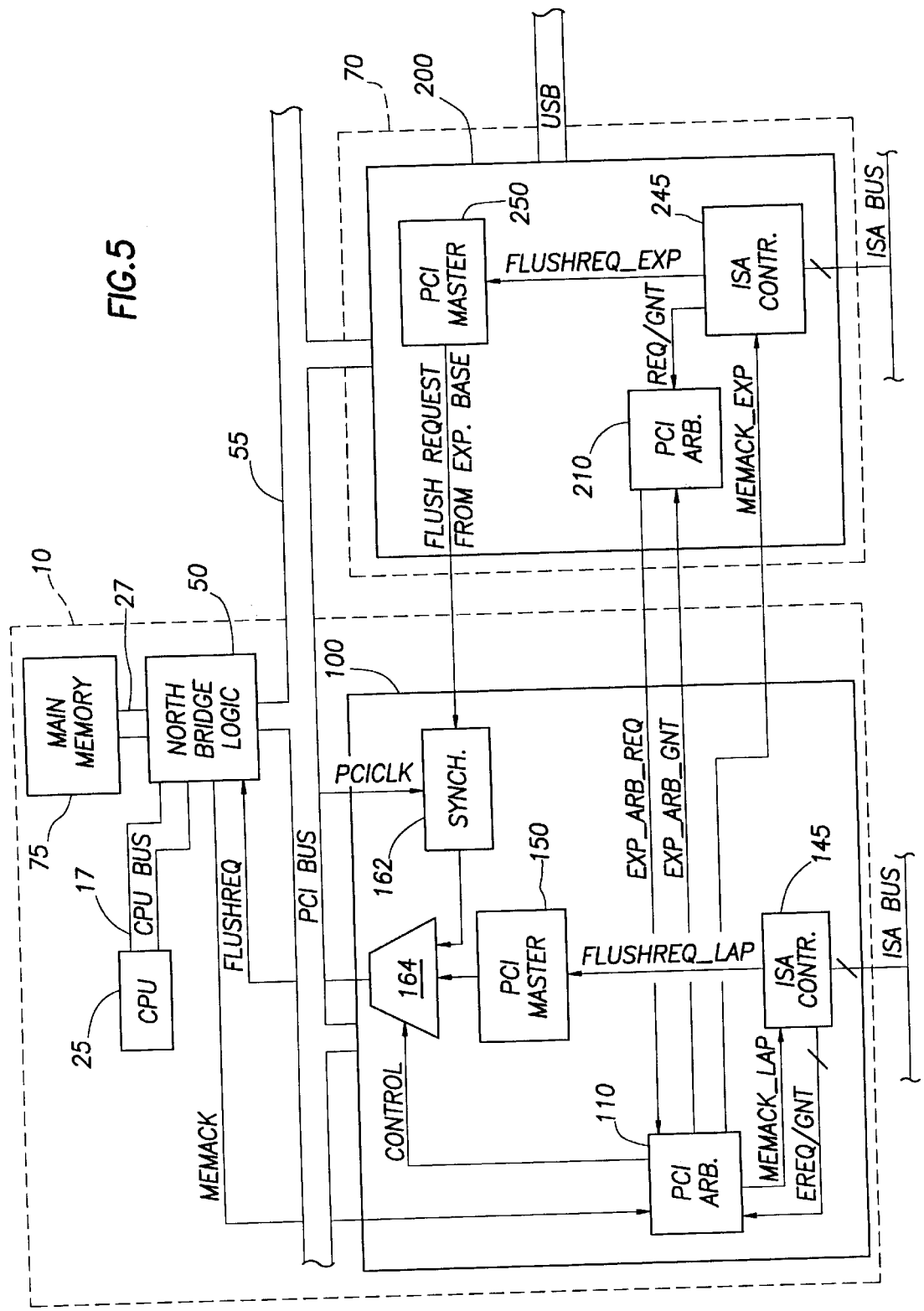
FIG. 5 is an alternative embodiment of the invention illustrating the use of South bridges in the portable computer as well as in an expansion base.

Referring still to FIG. 5, the North bridge receives a single FLUSHREQ signal from South bridge 100 even though either South bridge 100 or 200 is capable of asserting a flush request control signal. Accordingly, South bridge 100 preferably includes a logic gate 164 for generating a single FLUSHREQ signal in response to the assertion of a flush request from either or both South bridges. The logic gate 164 may comprise a multiplexer as shown, or any other suitable type of logic gate for asserting a single FLUSHREQ in response to an asserted FLUSHREQ from either South bridge. The PCI arbiter 110 controls the multiplexer 164 via a control line to select FLUSHREQ to the North bridge as either the flush request signal from PCI master 150 or from synchronizer 162. To distinguish the FLUSHREQ signals from the South bridges in FIG. 5, the FLUSHREQ generated internal to South bridge 100 is labeled FLUSHPREQ_LAP and the FLUSHREQ generated by the South bridge 200 in the expansion base is labeled FLUSHREQ_EXP.

The PCI master 250 in South bridge 200 and the PCI master 150 in computer system 10 respond to the assertion of the FLUSHREQ_EXP and FLUSHREQ_LAP signals from ISA controllers 245 and 145, respectively, according to the preferred embodiment described above. That is, each PCI master flushes its internal write queues and prevents new write requests from being posted once the ISA controllers assert the associated FLUSHREQ signal. Once the queues are flushed for a particular PCI master, that PCI master asserts a FLUSHREQ (FLUSHREQ_EXP or FLUSHREQ_LAP) signal. The OR gate 164 logically OR's together the two FLUSHREQ signals from the PCI masters 150, 250 to generate a single FLUSHREQ signal to the North bridge 50.

The South bridge 200 in the expansion base 70 may be run off of the expansion base's own clock signal. This clock may not be synchronized with the clock that coordinates the cycles that run on the PCI bus. Thus if desired, the flush request signal from the South bridge 200 in the expansion base may be synchronized to the PCI clock signal (PCICLK) from PCI bus 55. The PCICLK is a signal defined as part of the PCI bus standard and is well known to those of ordinary skill in the art. In one embodiment of the invention, South bridge 100 includes a synchronizing circuit 162 to synchronize FLUSHREQ_EXP to PCICLK. Alternatively, North bridge 50 may include the synchronizing circuit instead of the South bridge 100. The synchronizing circuit 162 is implemented as any commonly known circuit for this purpose and generally includes a flip-flop or other type of latching device that is clocked by the PCICLK signal from the PCI bus.

In another aspect of the invention, each South bridge 100, 200 includes a PCI arbiter—South bridge 100 includes PCI arbiter 110 and South bridge 200 includes a PCI arbiter 210. Each arbiter generally performs the functions described above with respect to FIG. 3. The PCI arbiter 110, however, includes additional arbitration logic to determine whether the South bridge arbiter 110 or 210 has control of the PCI bus 55. If no expansion base is used or the laptop computer system 10 is "undocked" from the expansion base 70, the PCI arbiter 110 will always control PCI bus arbitration. If the laptop computer system 10 is docked to a docking station 70, the PCI arbiter 210 in the South bridge 200 in the expansion base preferably is granted access to the PCI bus by the PCI arbiter 110 in the computer system 10 according to any suitable arbitration technique. The South bridge arbiter 210 can request arbitration control of the PCI bus 55 by asserting a request signal (EXP_ARB_REQ) to the PCI arbiter 110. If access is granted, the PCI arbiter 110 returns a grant signal (EXP_ARB_GNT) to the PCI arbiter 210 to permit South bridge arbiter 210 to control arbitration on the PCI bus 55.

The PCI arbiter 110 also keeps track of which South bridge, bridge 100 or 200, caused the assertion of the FLUSHREQ signal to the North bridge. When the North bridge 50 returns the MEMACK signal acknowledging that the North bridge has prepared itself for the upcoming ISA cycle (by flushing P2IQ 516, for example), the PCI arbiter 110 asserts a MEMACK signal to the ISA controller that initiated the cycle request. Thus, if ISA controller 145 initiated the request that caused FLUSHREQ to be asserted, PCI arbiter 110 asserts MEMACK_LAP to ISA controller 145. If ISA controller 245 initiated the request, however, PCI arbiter 110 asserts MEMACK_EXP to ISA controller 245. Once each ISA controller is ready to complete its cycle, that ISA controller asserts a request (REQ) signal to its associated PCI arbiter 110 or 210 which responds with a grant (GNT) once the arbiter 110 or 210 determines that the ISA cycle can run on the PCI bus.

In another aspect of the invention, each South bridge precludes its FLUSHREQ signal from being asserted to multiplexer 164 if the arbiter 110 or 210 in that South bridge does not have arbitration control of the PCI bus. This aspect advantageously precludes a South bridge from asserting a FLUSHREQ at a time when that bridge cannot complete the transaction because the other South bridge's arbiter is controlling the PCI bus. Preferably, the PCI master interface in each South bridge masks off the FLUSHREQ signal if that bridge does not have arbitration control of the PCI bus.

The above discussion in meant to be illustrative of the principles of the present invention. Numerous variations and modifications will become apparent to those skilled in the art once the above disclosure is fully appreciated. It is intended that the following claims be interpreted to embrace all such variations and modifications.

We claim:

1. A computer system, comprising:

a CPU;

a memory device;

at least one expansion bus device coupled to a primary expansion bus; and a North bridge logic unit coupling together said CPU, said memory device, and said primary expansion bus, said North bridge logic unit capable of running CPU cycles on said primary expansion bus and capable of running cycles initiated by said expansion device to said memory device;

wherein said primary expansion bus device includes a write queue for temporarily storing write requests to be run on said primary expansion bus, said expansion bus device asserting a flush request (FLUSHREQ) control signal to said North bridge after flushing said write queue, wherein while flushing said write queue, said CPU is allowed to run CPU cycles to said primary expansion bus via said North bridge logic unit.

2. The computer system of claim 1 wherein said expansion bus device comprises a South bridge logic unit coupling said primary expansion bus to a secondary expansion bus.

3. The computer system of claim 2 wherein said South bridge includes a primary expansion bus master interface for asserting said FLUSHREQ signal and said write queue is included in said primary expansion bus master interface.

4. A computer system, comprising:

a CPU;

a memory device;

a primary expansion bus, a secondary expansion bus;

a South bridge logic unit coupling said primary expansion bus and said secondary expansion bus;

a North bridge logic unit coupling together said CPU, said memory device, and said primary expansion bus, said North bridge logic unit capable of running CPU cycles on said primary expansion bus and capable of running cycles initiated by said South bridge logic unit to said memory device;

wherein said South bridge logic unit includes a write queue for temporarily storing write requests to be run on said primary expansion bus, said South bridge logic unit asserting a flush request (FLUSHREQ) control signal to said North bridge after flushing said write queue, wherein while flushing said write queue, said CPU is allowed to run CPU cycles to said primary expansion bus via said North bridge logic unit;

wherein said South bridge includes a primary expansion bus master interface for asserting said FLUSHREQ signal and said write queue is included in said primary expansion bus master interface; and wherein said South bridge further includes a bus controller coupled to said secondary expansion bus for providing an electrical interface between said South bridge and said secondary expansion bus, said bus controller receives a cycle request signal originating from a device coupled to the secondary expansion bus, and in response to the cycle request signal, said bus controller asserts a control signal to said primary expansion bus master interface to initiate a transaction cycle from said secondary expansion bus to said primary expansion bus.

5. The computer system of claim 4 wherein, in response to the assertion of said control signal, said primary expansion bus master interface flushes its write queue.

6. The computer system of claim 4 wherein, in response to the assertion of said control signal, said primary expansion bus master interface stops posting in said write queue write requests not associated with the transaction cycle that caused the bus controller to assert the control signal.

7. The computer system of claim 5 wherein the North bridge logic unit includes a CPU-to-primary expansion bus queue for posting CPU write requests to said primary expansion bus, and said North bridge responds to the assertion of said FLUSHREQ signal by causing the CPU-to-primary expansion bus queue to flush and preventing the CPU from posting additional CPU-to primary expansion bus write requests to the CPU-to-primary expansion bus queue.

8. The computer system of claim 5 wherein the North bridge includes a CPU-to-primary expansion bus queue for posting CPU write requests to said primary expansion bus, a CPU interface and an interface to said primary expansion bus that receives said FLUSHREQ signal and, in response, asserts a no post signal to said CPU interface to prevent said CPU interface from further posting additional CPU write requests to said CPU-to-primary expansion bus queue.

9. A computer system, comprising:

a CPU, a memory device;

a North bridge logic device coupling together a primary expansion bus, said CPU and said memory device;

a secondary expansion bus;

a device coupled to said secondary expansion bus;

a South bridge logic device connected to said primary expansion bus, said South bridge logic device coupling said secondary expansion bus to said primary expansion bus for running cycles originating from said device coupled to the secondary expansion bus on said primary expansion bus;

wherein said South bridge logic device includes:

a primary expansion master interface including a write queue, said write queue comprising a plurality of storage rows for temporarily storing write requests from a secondary expansion bus pending execution on said primary expansion bus;

a bus controller for said secondary expansion bus, wherein said bus controller asserts a control signal to said primary expansion bus master interface which responds by flushing said write queue, said bus controller asserting said control signal in response to said device on said secondary expansion bus initiating a bus cycle; and wherein said primary expansion bus master interface, after flushing said write queue, asserts a flush request (FLUSHREQ) signal to said North bridge, and wherein while flushing said write queue, said CPU is allowed to run CPU cycles to said primary expansion bus via said North bridge logic unit.

10. The computer system of claim 9 wherein said flush request signal causes said North bridge to execute a write request from said CPU to said primary expansion bus that are currently pending in said North bridge.

11. The computer system of claim 10 wherein said FLUSHREQ signal also causes said North bridge to discontinue storing write requests from said CPU to said primary expansion in said North bridge.

12. The computer system of claim 11 wherein said primary expansion bus comprises a PCI bus, and said secondary expansion bus comprises an ISA bus.

13. A portable computer system, comprising:

a laptop computer including:

a CPU;

a memory device;

a primary expansion bus;

a North bridge logic device coupling said primary expansion bus to said CPU and said memory device, said North bridge logic device including a North bridge buffer for temporarily storing cycles to be run on said primary expansion bus; and a secondary laptop expansion bus;

a first device coupled to said secondary laptop expansion bus; and a first SOU bridge logic device coupling said secondary laptop expansion bus to said primary expansion bus for running cycles originating from said first device to said primary expansion bus, said first South bridge including a first write queue for temporarily storing write requests to be run on said primary expansion bus;

wherein said first South bridge topic device is capable of generating a first internal control signal to flush said first write queue and, after flushing said write queue, requesting that said North bridge logic device flush said North bridge buffer before said first South bridge logic device permits a cycle from said secondary laptop expansion bus to run on said primary expansion bus;

an expansion base to which the laptop computer can be mated so as to use said laptop computer in a desktop configuration, said expansion base including:

a secondary expansion base expansion bus;

a second device coupled to said secondary expansion base expansion bus; and a second South bridge topic device connected to said primary bus for running cycles originating from said second device to said primary expansion bus, said second South bridge including second write queue for temporarily storing write requests to be run on said primary expansion bus;

wherein said second South bridge logic device generates a second internal control signal to flush said second write queue and, after flushing said second write queue, requests that said North bridge logic device flush said North bridge buffer before said second South bridge logic device permits a cycle from said secondary expansion base expansion bus to run on said primary expansion bus.

14. The computer system of claim 13 wherein said second South bridge logic device asserts an external expansion base flush request signal to said first South bridge logic device after flushing said second write queue.

15. A portable computer system, comprising:

a laptop computer including:
a CPU;
a memory device;
a primary expansion bus:
a North bridge logic device coupling said primary expansion bus to said CPU and said memory device, said North bridge logic device including a North bridge buffer for temporarily storing cycles to be run on said primary expansion bus; and
a secondary laptop expansion bus;
a first device coupled to said secondary laptop expansion bus; and
a first South bridge logic device coupling said secondary laptop expansion bus to said primary expansion bus for running cycles originating from said first device to said primary expansion bus, said first South bridge including:
a first write queue for temporarily storing write requests to be run on said primary expansion bus;
a first internal control signal that, when asserted, flushes said first write queue; and
a multiplexer coupled to said first write queue and to the second internal control signal, wherein said multiplexer outputs a laptop FLUSHREQ signal to said North bridge logic device to flush said North bridge buffer after said first write queue is flushed; and an expansion base to which the laptop computer can be mated so as to use said laptop computer in a desktop configuration, said expansion base including:
a secondary expansion base expansion bus;
a second device coupled to said secondary expansion base expansion bus; and
a second South bridge logic device coupling said secondary expansion base bus to said primary expansion bus for running cycles originating from said second device to said primary expansion bus, said second South bridge including:
a second write queue for temporarily storing write requests to be run on said primary expansion bus;
a second internal control signal that, when asserted, flushes said second write queue; and
an external expansion base flush request signal generated by said second South bridge logic device and coupled to said multiplexer in said first South bridge logic device, wherein said second South bridge logic device asserts the second internal control signal to flush said second write queue before asserting the external expansion base flush request signal;

wherein said multiplexer generates the laptop FLUSHREQ signal to said North bridge logic device to flush said North bridge buffer if the external expansion base flush request signal from said second South bridge logic device is asserted or the second internal control signal in said first South bridge logic device is asserted.

16. The computer system of claim 15 wherein said first South bridge logic device logic device includes a first arbitration logic unit for arbitrating control of said primary expansion bus, and wherein said second South bridge logic device includes a second arbitration logic unit for arbitrating control of said primary expansion bus.

17. The computer system of claim 16 wherein said first arbitration logic unit also includes logic for keeping track of which one of said first and second South bridge logic devices asserted a control signal to flush said first and second write queues.

18. The computer system of claim 15 wherein said first South bridge logic device in the laptop computer includes synchronization logic for synchronizing the external expansion base flush request signal with a clock signal provided on the primary expansion bus.

19. The computer system of claim 15 wherein said North bridge responds to said laptop FLUSHREQ signal by flushing any pending CPU-to-primary expansion bus cycles.

20. The computer system of claim 13 wherein said first South bridge logic device precludes generating said first internal control signal if said second South bridge logic device has arbitration control of said primary expansion bus, and wherein said second South bridge logic device precludes generating said second internal control signal if said first South bridge logic device has arbitration control of said primary expansion bus.

21. A method for running cycles from a device coupled to a secondary expansion bus, through a South bridge connected to said secondary expansion bus, and to a North bridge coupled to said South bridge via a primary expansion bus, comprising:

(a) asserting a cycle request signal to run a cycle from said device coupled to the secondary expansion bus to the South bridge;
(b) flushing a write queue included within the South bridge in response to said cycle request signal;
(c) permitting bus cycles from a CPU to run on said primary expansion bus during (b);
(d) asserting a flush request signal from the South bridge to the North bridge after said South bridge write queue is flushed;
(e) flushing a write queue included within the North bridge in response to receiving said flush request signal;
(f) asserting an acknowledge signal from the North bridge to the South bridge after said North bridge write queue is flushed; and
(g) completing said cycle initiated by said device on said secondary expansion bus.

22. The method of claim 21 further including disallowing additional cycles to run through said South bridge to said primary expansion bus once said cycle request signal is asserted.

23. The method of claim 21 further including disallowing additional cycles to run from a CPU through said North bridge to said primary expansion bus once said flush request signal is asserted to said North bridge.

24. A South bridge device coupling together a plurality of expansion busses, comprising:
a primary expansion master interface connected to a primary expansion bus;
a write queue coupled to said primary expansion bus master interface:
a primary expansion bus arbiter for arbitrating access to said primary expansion bus; and
a bus controller connected to a secondary expansion bus, wherein said bus controller asserts an internal flush request signal to said primary expansion master interface when a device coupled to said secondary expansion bus originates a request for access to said primary expansion bus;
wherein said primary expansion master interface flushes said write queue in response to the flush request signal and, thereafter, directs said primary expansion bus arbiter to assert an external FLUSHREQ signal to a North bridge, and wherein while flushing said write queue, said CPU is allowed to run CPU cycles to said primary expansion bus via said North bridge logic unit.

25. The South bridge of claim 24 wherein said primary expansion bus comprises a PCI bus and said secondary expansion bus comprises an ISA bus.

* * * * *